(12) United States Patent
Gay-Bellile et al.

(10) Patent No.: US 7,145,965 B2
(45) Date of Patent: Dec. 5, 2006

(54) DIGITAL DEMODULATOR FOR TERRESTRIAL RECEIVER

(75) Inventors: Olivier Gay-Bellile, Paris (FR); Xavier Marchal, Courbevoie (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 673 days.

(21) Appl. No.: 10/196,049

(22) Filed: Jul. 15, 2002

(65) Prior Publication Data

US 2003/0021361 A1 Jan. 30, 2003

(30) Foreign Application Priority Data

Jul. 17, 2001 (EP) ................................. 01401913

(51) Int. Cl.
*H03K 9/00* (2006.01)
*H04L 27/06* (2006.01)
*H04L 27/14* (2006.01)
*H04L 27/22* (2006.01)

(52) U.S. Cl. ...................... 375/316; 329/315; 329/311; 375/239

(58) Field of Classification Search ................ 375/316, 375/222, 232, 260, 304, 239; 329/311, 315
See application file for complete search history.

(56) References Cited

U.S. PATENT DOCUMENTS 4,754,449 A * 6/1988 Crookshanks ............... 370/307
6,167,526 A * 12/2000 Carlson ....................... 713/400
6,539,065 B1 * 3/2003 Furukawa .................... 375/316
6,898,235 B1 * 5/2005 Carlin et al. ................ 375/219
2002/0098797 A1 * 7/2002 Brede et al. ............... 455/3.01

OTHER PUBLICATIONS

Applications, Technologies, Architectures,and Protocols for Computer Communication archive□□J. Salz and S. B. Weinstein, Proceedings of the first ACM symposium on Problems in the optimization of data communications systems, pp. 99-128, 1969.*
Advanced Communications Technologies and Services (ACTS), Digital Video broadcasting Integrated Receiver Decoder Receiver Specifications and Architectures (DVBIRD) WP1, "First Receiver Architecture ICs specification," May 1996, pp. 17-21.

* cited by examiner

*Primary Examiner*—Jean B. Corrielus
*Assistant Examiner*—Erin M. File
(74) *Attorney, Agent, or Firm*—Michael E. Belk

(57) ABSTRACT

A method and a demodulator for processing a Fast Fourier Transform using data blocks include a Fast Fourier Transform (FFT) coprocessor and a digital signal processor (DSP). The FFT coprocessor includes a start function and a computation function (F_FFT). The start function is adapted to generate a start signal each time a first data of a new block is received. The DSP includes a time error function which indicates to the start function for how much data it has to wait before a new start signal is generated.

16 Claims, 3 Drawing Sheets

DIGITAL DEMODULATOR FOR TERRESTRIAL RECEIVER

The present invention relates to a digital demodulator adapted to compute a Fast Fourier Transform using data blocks. The invention also relates to an associated Fast Fourier Transform processing method.

Such a demodulator may be used, for example, in a terrestrial receiver.

Figure 1:
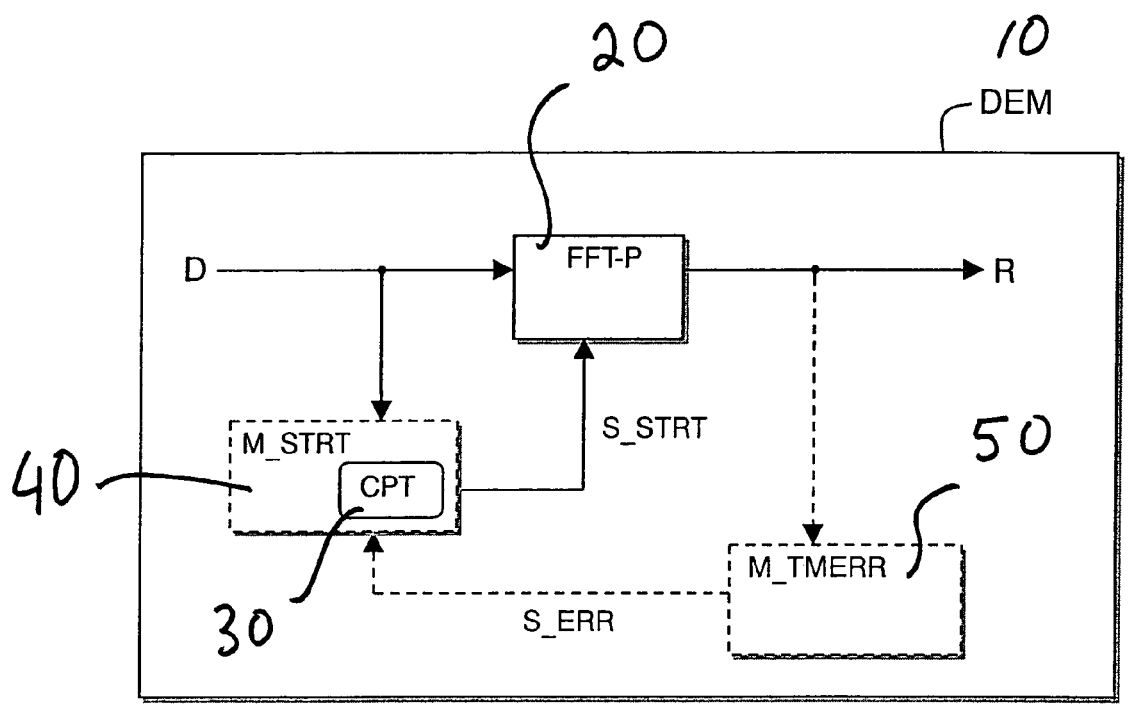

Fast Fourier Transform computation is a well-known problem in a digital signal-processing domain because of its complexity in terms of computation power and memory access requirements. There are a lot of processors dedicated to a Fast Fourier Transform computation commonly called FFT processor 20 shown in FIG. 1. To make such a computation, the processors work on data blocks, said data also being called symbols. Therefore, as described in the project number DVbird WP1-D01 entitled "First Receiver Architecture Ics specification" edited by the ACTS ("Advanced Communication Technologies & Services") in May 1996, a start signal is often generated to indicate a first data (D) of a new block. Said start signal is sent to the FFT processor 20. FIG. 1 shows a demodulator 10 where the signal generation requires:

a counter (CPT) 30 to count a number of data which have been input to the FFT processor (FFT-P) 20 since a last start signal (S_STRT), in order to know when to start a new Fast Fourier Transform computation, and some feedback information (S_ERR) to generate a start signal S_STRT.

Such a counter CPT 30 is contained in a start generator dedicated module (M-STRT) 40 and such feedback information S_ERR are output by a time error dedicated module (M-TMERR) 50. If the number of input data has reached the number of data in a block, usually 2 kilo-octets or 8 kilo-octets, a start signal S_STRT can be sent to the FFT processor FFT_P 20. The start signal has to be synchronized with a first data D of a new block. Such synchronization is needed in order for the FFT processor FFT_P 20 to save the data of the data block as soon as a first data is received. If there is an error of synchronization, the feedback information S_ERR tells the start generator M-STRT 40 how much additional data D it has to count before a new start signal is sent.

One problem of this solution is that if the FFT processor is used as a coprocessor to a general purpose digital signal processor (DSP), on the one hand, the FFT coprocessor counts the number of data D which has been input to make a FFT computation, and, on the other hand, the digital signal processor DSP also counts a number of data D to be input to the Fast Fourier Transform coprocessor before enabling the sending of a start signal S_STRT. Then, such digital signal processor enables the start generator M_STRT so as to synchronize the emission of a start signal S_STRT with a first data D of a data block. Thus, a lot of computation power from the digital signal processor DSP is required to manage a Fast Fourier Transform computation and to make such synchronization. It is a problem especially when those data do not come from said digital signal processor.

Accordingly, it is an object of the invention to provide a digital demodulator adapted to compute a Fast Fourier Transform using data blocks, which avoids unnecessarily monopolizing resources such as a digital signal processor.

To this end, there is provided a digital demodulator which comprises:

a Fast Fourier Transform coprocessor comprising a start generator function adapted to send a start signal to a Fast Fourier Transform computation function, said start signal indicating a first data of a new data block, and a digital signal processor comprising a time error function adapted to send feedback information to said Fast Fourier Transform coprocessor, said feedback information indicating for how much data the start generator function has to wait before a new start signal is sent.

In addition, there is provided a method comprising the steps of:

sending a start signal to a Fast Fourier Transform computation function via a Fast Fourier Transform coprocessor, said start signal indicating a first data of a new data block, and sending feedback information to said Fast Fourier Transform coprocessor via a digital signal processor, said feedback information indicating for how much data it has to wait before a new start signal is sent.

As we will see in detail further on, such a digital demodulator enables the Fast Fourier Transform coprocessor to work by itself with no interaction with the digital signal processor, if no error is detected. Thus, said digital signal processor has free time to work with other coprocessors.

Figure 2:
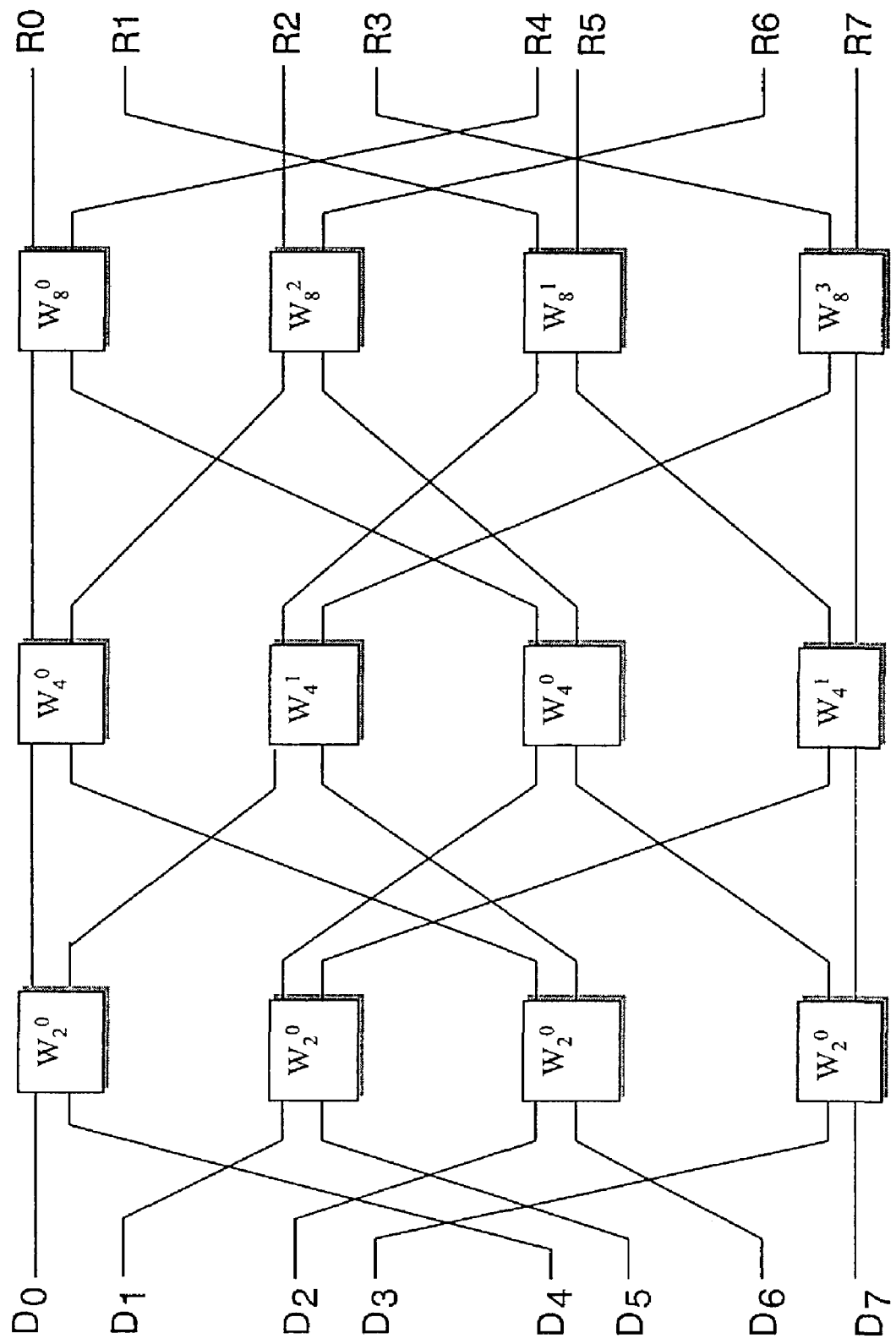
Figure 3:
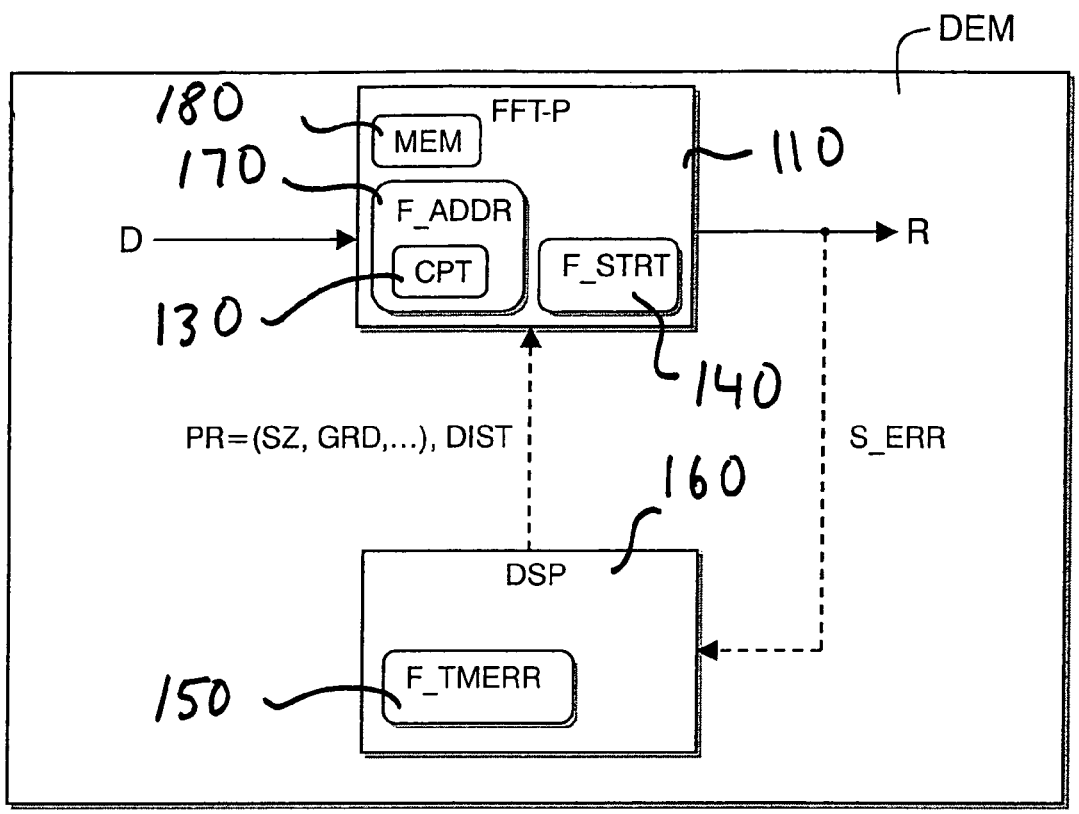
Figure 4:
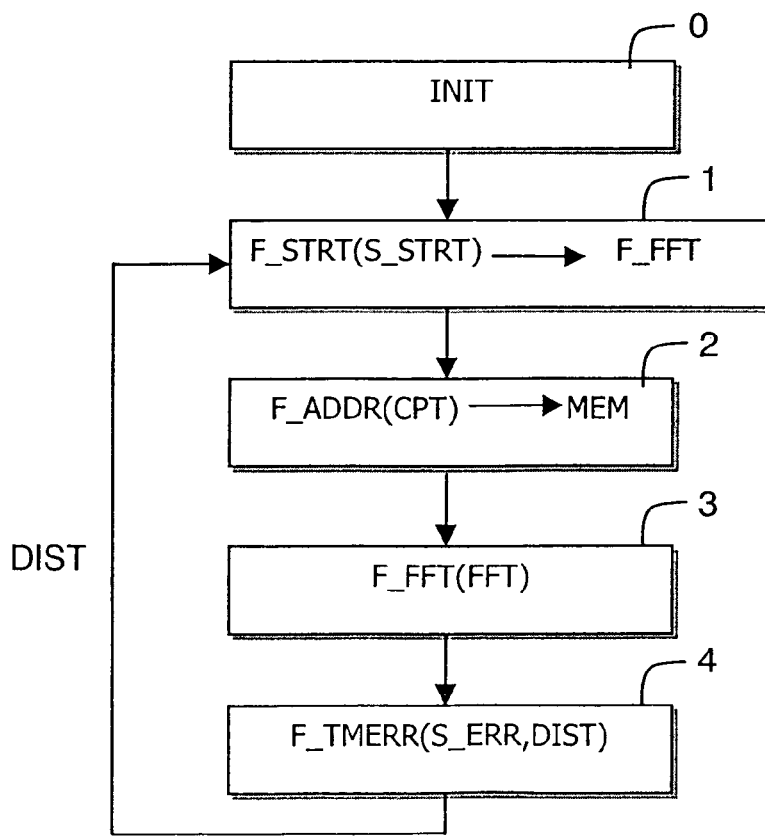

Additional objects, features and advantages of the invention will become apparent upon reading the following detailed description and upon reference to the accompanying drawings in which:

FIG. 1 illustrates some components of a digital demodulator as described in the prior art, and FIG. 2 is a graph of a Fast Fourier Transform algorithm used in a digital demodulator according to the invention, FIG. 3 illustrated some components of the digital demodulator according to the invention, and FIG. 4 is a diagram of a Fast Fourier Transform method implemented in the digital demodulator of FIG. 3.

In the following description, well-known functions or constructions by a man skilled in the art are not described in detail since they would obscure the invention in unnecessary detail.

The present invention relates to a digital demodulator DEM adapted to compute a Fast Fourier Transform using data blocks. Such a digital demodulator DEM is used for a demodulation of a digital television system, and more particularly for a demodulation in a terrestrial receiver. When such a receiver receives a signal, it receives it in the form of data blocks also called symbols packets. Such packets have fixed length. For a standard called DVB-T (<<Digital Video Broadcasting Terrestrial>>) edited by the ETSI (<<European Telecommunications Standard Institute>>), the length of the packet is 2 Kilo-octets or 8 Kilo-octets. One step of the demodulation is to compute Fast Fourier Transforms on the data D of a packet. The computation of a Fast Fourier Transform is made thanks to an algorithm called the Cooley-Tukey algorithm of radix 2 whose corresponding graph is shown in FIG. 2. Such a graph comprises coefficients W. Final results R, which are frequency data, are computed with input data D and said coefficients W. Said coefficients W are known and usually saved in a table of a memory MEM. Such a computation will not be explained here, as it is well known by the man skilled in the art.

In order to compute a Fast Fourier Transform FFT, as shown in FIG. 3, the digital demodulator DEM 300 comprises:

a Fast Fourier Transform coprocessor FFT_P 110 comprising a start generator function F_STRT 140 adapted to send a start signal S_STRT to a Fast Fourier Transform computation function F_FFT, said start signal indicating a first data D of a new data block, and a digital signal processor DSP 160 comprising a time error function F_TMERR 150 adapted to send feedback information DIST to said Fast Fourier Transform coprocessor FFT_P 110, said feedback information DIST indicating how much data D the start generator function F_STRT 140 has to wait until the sending of a new start signal S_STRT.

The Fast Fourier Transform computation function F_FFT is adapted to compute a Fast Fourier Transform on data D of a data block. The Fast Fourier Transform coprocessor FFT_P 110 also comprises an address generation function F_ADDR 170 adapted to save said data D in particular addresses in the memory MEM 180 of the Fast Fourier Transform coprocessor FFT_P 110, and adapted to count the input and saved data D with the counter CPT 130.

As shown in FIG. 4, in an initialization step 0), the digital signal processor DSP downloads into the Fast Fourier Transform coprocessor FFT_P the parameters required for a Fast Fourier Transform computation. Those parameters are in particular:

the size SZ of a data block, 2 Kilo-octets or 8 Kilo-octets,
a guard interval GRD between the computation of two Fast Fourier Transforms FFT etc.

Said guard interval GRD is used to avoid, in particular, a well-known phenomenon called intersymbol interferenceISI phenomenon.

Such an initialization step is made each time there is a deep change regarding the environment of the receiver. For example, when there is too much noise around the receiver, the size of a data block is preferably 8 Kilo-octets.

When the receiver receives some data D of a data block, the digital demodulator will compute a Fast Fourier Transform on these data as follows.

In a first step 1), the start generator function F_STRT detects a first data D of a new data block, and then sends a start signal S_STRT to the Fast Fourier Transform computation function F_FFT.

In a second step 2), the address generation function F_ADDR counts the number of input data D with its counter CPT, and saves them in addresses of the memory MEM.

In a third step 3), the computation function F_FFT waits for all the data D of a block to be input. Then it computes a Fast Fourier Transform, using the Cooley-Tukey algorithm, on these data D with the information given by the digital signal processor DSP and thanks to the counter CPT of the address generation function F_ADDR.

In a fourth step 4), if there is an error S_ERR in the final results R, said error S_ERR is detected by the time error function F_TMERR of the digital signal processor DSP. For example, if a Fast Fourier Transform computation has begun one data D too early, or one data D too late, such an error is detected. Said detection is well known by the man skilled in the art. Said error S_ERR must not be propagated to the other Fast Fourier Transform computations. Therefore, the time error function F_TMERR determines feedback information, for example, a correction distance DIST evaluated in a number N of data D. For example, N is equal to 1 if the Fast Fourier Transform computation has begun one data too late. This correction distance DIST is then sent to the Fast Fourier Transform coprocessor FFT_P. The correction distance DIST enables to know how much additional data D we have to wait before finding a first data D of a new data block. In other words, this correction distance DIST enables to know for how much data D said Fast Fourier Transform coprocessor FFT_P, and more precisely, the signal generator function F_STRT has to wait before sending again a new start signal S_STRT, and thus before computing a new Fast Fourier Transform.

Then, we go back to the first step 1). The start generator function F_STRT detects a first data D of a new data block thanks to the counter CPT. When the counter CPT has reached a value equal to a data block length plus a guard interval GRD and plus (when the Fast Fourier Transform computation has begun some data too late) or minus (when the Fast Fourier Transform computation has begun some data too early) the correction distance DIST, a new first data is received. Then the start generator F_STRT sends a start signal S_STRT to the Fast Fourier Transform computation function F_FFT etc . . . until no more data D are received.

Thus, as we can see, one advantage of the present invention is that, when no error S_ERR is detected, the Fast Fourier Transform coprocessor FFT_P can work by itself without any interaction with said digital processor DSP. Moreover, in the method according to the invention, said coprocessor FFT_P does not wait for a start signal to be sent from said digital signal processor. Hence, said coprocessor FFT_P is independent of said digital processor DSP. Thus, in the meantime, said digital signal processor DSP can be addressed by other coprocessors.

Note that, in order to keep a former mode (when the Fast Fourier Transform coprocessor FFT_P receives a start signal from the digital signal processor), if needed, in a first non limitative embodiment, the digital signal processor DSP comprises deactivation means M_DES which are adapted to deactivate the start generator function F_STRT in the Fast Fourier Transform coprocessor FFT_P. The deactivation is done during the initialization step 0). The deactivation means can be a program implemented in said digital signal processor. Hence, either the former mode is kept when the start generator function F_STRT is disabled; or a new mode according to the invention is maintained when the start generator function F_STRT is enabled.

Note also that, in case there is an adequate synchronization or in case no error correction is asked for, which is rare, a direct memory access can be used by the Fast Fourier Transform coprocessor FFT_P. The digital signal processor DSP does not manage the memory access of said Fast Fourier Transform coprocessor anymore. Thus, said digital signal processor DSP is free for managing other tasks.

It is to be understood that the present invention is not limited to the aforementioned embodiments and variations and modifications may be made without departing from the spirit and scope of the invention as defined in the appended claims.

It is to be understood that there are numerous ways of implementing functions of the method according to the invention by means of items of hardware or software, or both, provided that a single item of hardware or software can carry out several functions. It does not exclude that an assembly of items of hardware or software or both carry out a function. For example, the start generator function F_STRT can be combined with the address generation function F_ADDR, thus forming a single function without modifying the Fast Fourier Transform processing method in accordance with the invention.

Said hardware or software items can be implemented in several ways, such as by means of wired electronic circuits or by means of an integrated circuit that is suitably programmed. The integrated circuit can be contained in a computer or in a demodulator. In the second case, the different means of demodulator according to the invention can be hardware or software items as stated above.

The integrated circuit comprises a set of instructions. Thus, said set of instructions contained, for example, in a computer programming memory or in a demodulator memory may cause the computer or the demodulator to carry out the various steps of the Fast Fourier Transform processing method.

The set of instructions may be loaded into the programming memory by reading a data carrier such as, for example, a disk. A service provider can also make the set of instructions available via a communication network such as, for example, the Internet.

Any reference sign in the following claims should not be construed as limiting the claim. It will be obvious that the use of the verb "to comprise" and its conjugations does not exclude the presence of any other steps or elements besides those defined in any claim. The article "a" or "an" just following the verb "to comprise" and preceding an element or step does not exclude the presence of a plurality of such elements or steps.

The invention claimed is:

1. A digital demodulator for computing a Fast Fourier Transform using data blocks comprising:
   a Fast Fourier Transform coprocessor comprising a counter and a start generator function adapted to generate a start signal indicating a first data of a new data block, and
   a digital signal processor comprising a time error function adapted to send feedback information including an error to said Fast Fourier Transform coprocessor, said feedback information indicating for how much data the start generator function has to wait before a new start signal is generated,
   said coprocessor being configured to generate said start signal when a value of said counter reaches at least a length of a data block, plus a guard interval and plus said error.

2. The digital demodulator of claim 1, wherein said feedback information indicate that said Fast Fourier Transform coprocessor had began computations too early or too late relative to said first data.

3. The digital demodulator of claim 1, wherein said feedback information being N indicates that a computation performed by said Fast Fourier Transform coprocessor does not include at least N data points of said new data block.

4. A Fast Fourier Transform processing method using data blocks, comprising the acts of:
   sending a start signal to a Fast Fourier Transform computation function via a Fast Fourier Transform coprocessor including a counter, said start signal indicating a first data of a new data block, and
   1 sending feedback information including an error to said Fast Fourier Transform coprocessor via a digital signal processor, said feedback information indicating for how much data it has to wait before a new start signal is sent,
   wherein said start signal is sent when a value of said counter reaches at least a length of a data block, plus a guard interval and plus said error.

5. A computer program product of a demodulator comprising a set or instructions, which when loaded into said demodulator, causes the demodulator to carry out the method as claimed in claim 4.

6. A computer program product of a computer comprising a set of instructions, which when loaded into said computer, causes the computer to carry out the method as claimed in claim 4.

7. The Fast Fourier Transform processing method of claim 4, wherein said feedback information indicate that said Fast Fourier Transform coprocessor had began computations too early or too late relative to said first data.

8. The Fast Fourier Transform processing method of claim 4, wherein said feedback information being N indicates that a computation performed by said Fast Fourier Transform coprocessor does not include at least N data points of said new data block.

9. An apparatus comprising:
   a coprocessor configured to generate a start signal indicating a start of a data block, perform a computation on data of said data block, and output a result of said computation; and
   a processor configured to detect an error in said result and to provide a feedback signal to said coprocessor indicative of said error so that said start signal is generated at a correct time,
   wherein said coprocessor further compr:ses a counter, said coprocessor being configured to generate said start signal when a value of said counter reaches at least a length of said data block, plus a guard interval and plus said error.

10. The apparatus of claim 9, wherein said error is detected when said coprocessor had began said computation too early or too late relative to a first data of said data block.

11. The apparatus of claim 9, wherein said error being one indicates that said computation has begun one data too late.

12. The apparatus of claim 9, wherein said error being one indicates that said computation does not include at least one data of said data block.

13. The apparatus of claim 9, wherein said error being N indicates that said computation does not include at least N data of said data block.

14. The apparatus of claim 9, wherein said error is indicative of how much said coprocessor must wait before sending a new one of said start signal.

15. The apparatus of claim 9, wherein said coprocessor is configured to generate said start signal upon detection of a first data of said data block.

16. The apparatus of claim 9, wherein said processor provides said length to said coprocessor.

* * * * *